United States Patent Office 2,990,668
Patented July 4, 1961

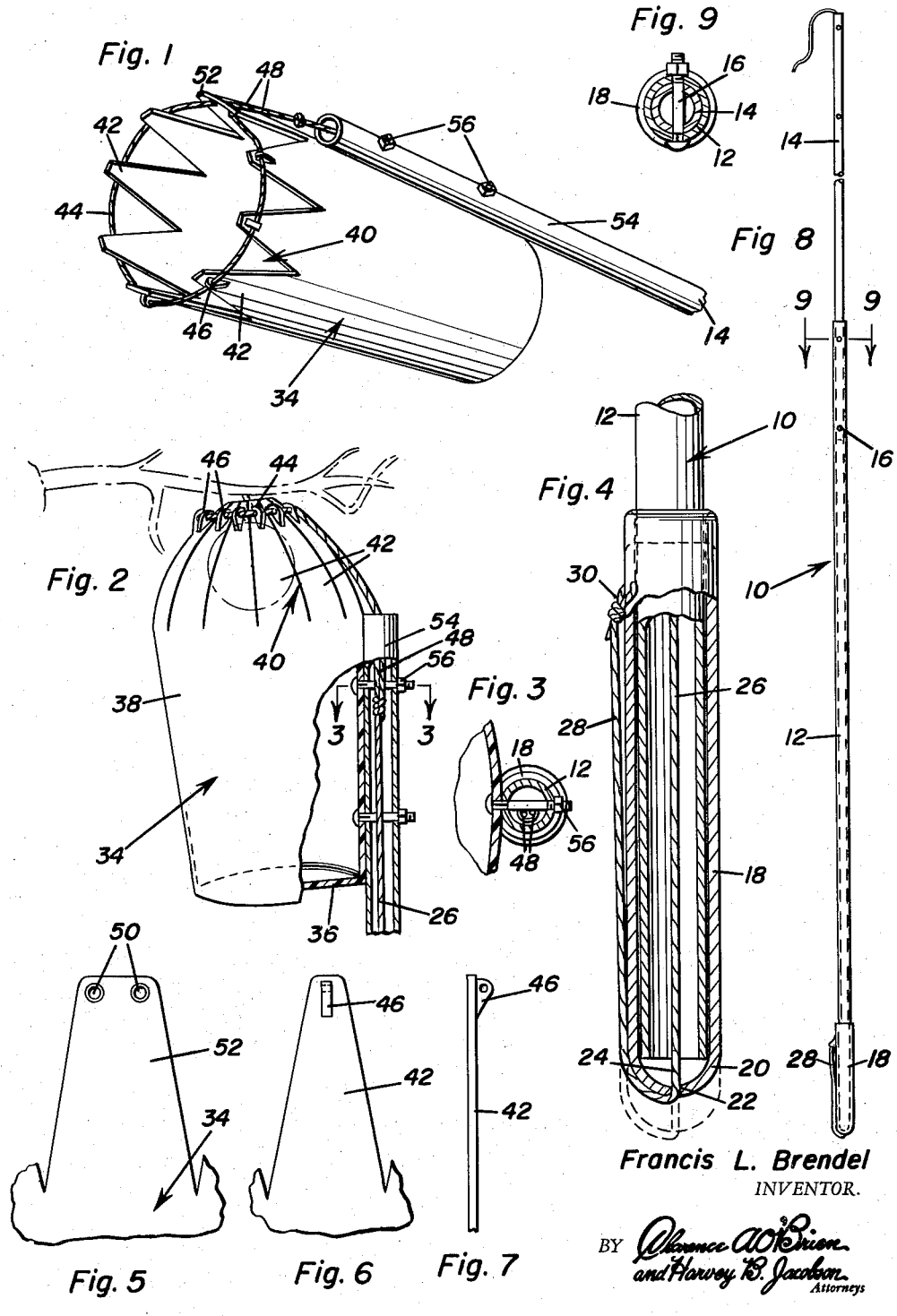

2,990,668
FRUIT PICKER
Francis L. Brendel, Rte. 2, Box 33, Bourbon, Mo.
Filed Feb. 25, 1960, Ser. No. 11,068
6 Claims. (Cl. 56—333)

The present invention relates to a novel and improved long-handled fruit picking and gathering implement wherein the user may operate the same from an advantageous standing position in a manner similar to that advocated in generally analogous prior art pickers.

As may well be evident from the preceding general statement of the invention is old in the art to use extensible and contractible pole-like handles and to install an expansible and contractible basket-like picker and receiver on the upper end thereof. By reason of the fact that the top or mouth of the receiver is open and radially expansible and contractible mechanical fingers are operated by a pull-cord or the like, the user is enabled to pick the fruit from the tree while standing on the ground. The construction just recited may be said to be common to the art and it is also old in this line of endeavor to employ a drawstring which is remote controlled by the user standing on the ground. One patent exemplary of that which has just been described would be Stansbury et al. 771,846 (expired) and Brockschmidt 1,362,471 (expired) represents another patent which may be referred to.

If the reader will familiarize himself with these two prior patents and will keep in mind that there are many other generally similar adaptations, he will be better prepared to delve into the instant disclosure with a view toward ascertaining that certain practical and signifcant improvements are herein under consideration. For example, instead of using a basket or receiver fabricated from resilient wires, or a cage made from openwork fabricated wire, or a cloth or an equivalent sack, the present invention has to do with a transparent imperforate vertically elongated receptacle, somewhat in resemblance of a large cup. The smooth surfaced walls of this receiver make it possible to line it up with easy-to-damage fruit but to be able to clearly see the fruit therethrough.

By notching or slitting the upper portion of the wall an expansible and contractible mouth portion and resilient fingers are provided and satisfactory picking and quick opening and closing results are had.

By using transparent sheet plastic material having requisite properties of strength, durability, lightness in weight and keeping in mind that the product can be mass-produced it will be clear that such advantages as these, contrasted to prior art accomplishments, serve to categorize this advance in the art as a worthwhile achievement. Then, too, it is submited that the instant endeavor involves a construction which is not only well adapted for the purposes for which it is intended but involves a construction which, because of simplicity and economy, will appeal to manufacturers, retailers, and users.

The invention also features a sleeve which is slidingly mounted on the bottom of the handle and to which the adjacent lower end of the pull-cord is attached and by way of which the pull-cord may be reliably and conveniently stressed and released.

With the above and other attending objects in view the invention pertains to the unified over-all construction and the novel combination and arrangement of component parts hereinafter fully described, illustrated in the accompanying drawing and comprehended in the invention as claimed. In this connection it is to be understood that minor changes in shape, size, materials and rearrangement of details may be resorted to in actual practice without departing from the spirit of the invention or the invention as claimed.

In the accompanying drawing, wherein like numerals are employed to designate like parts throughout the views:

FIG. 1 is a view in perspective showing the upper end of the handle or pole and the improved picker and receiver with the same open;

FIG. 2 is a view also in perspective showing how the picker is used to pick and trap the fruit, portions of the construction appearing in section;

FIG. 3 is an enlarged cross-section on the line 3—3 of FIG. 2;

FIG. 4 is a view on an enlarged scale showing the slidingly mounted sleeve-like pull-cord operating grip on the lower end of the handle;

FIGS. 5, 6 and 7 are fragmentary detail views;

FIG. 8 is a view in elevation and on a smaller scale showing the over-all construction of the handle; and FIG. 9 is a section on the line 9—9 of FIG. 8.

As seen in FIG. 8 the handle, which is to be operated by the user while standing on the ground, is denoted generally by the numeral 10 and comprises cooperating sections 12 and 14 telescopingly connected together and separable and adjustable as at 16. A sleeve-like slidingly mounted hand-grip 18 in the form of an elongated socket (see FIG. 4) is mounted on the lower end of the handle and the bottom thereof is closed at 20 but is centrally provided with a restricted hole or aperture 22 for a cooperating portion 24 of the pull-cord 26. The terminal end portion 28 of the pull-cord is tied or otherwise anchored at 30 exteriorly of the handle and is operable in the manner designated by full and dotted lines. The entire handle is tubular to provide a passage for the pull or control cord. The expression "cord" is used here to cover any suitable flexible element equivalent to a cord.

With respect now to the picking and trapping receiver this is denoted generally by the numeral 34. As before mentioned, it is of vertically elongated cup-like form or construction and is made of a suitable grade of commercial plastics. The bottom is circular as at 36 and is preferably imperforate. The generally cylindrical wall portion 38 is also imperforate. As seen in FIG. 1 at the left the upper end is open and the upper end portion is provided with a plurality of tapered, resilient picking fingers 42 defining V-shaped notches or recesses 40. These fingers are possessed of the desired degree of resiliency so that they normally have the open position seen in FIG. 1 but may be drawn to the closed picking position seen in FIG. 2. To accomplish this a drawstring 44 is employed and the string is passed through holes provided therefor in lugs 46 on the upper freely bendable end portions of the picking fingers. The drawstring has end portions 48 (FIG. 1) which are passed slidingly through grommet-protected holes 50 in the finger 52, that is, the finger which is lined up with the upper open end of the upper handle section 54. This handle section is bolted or otherwise secured at 56 to the exterior of the receiver in order to line up the bore of the over-all handle with the grommets 50 and finger 52 and to make sure that the pull-cord operates effectively.

This picker and gatherer has been actually constructed and is being used advantageously. It is of the utmost in simplicity, construction and mode of handling. In fact, the production and sale price and simplicity of construction are sufficient to place this contrivance in a class by itself.

It is believed that a careful consideration of the statement of the invention, the objectives and description of the figures and structure will enable the reader to obtain a comprehensive understanding of the subject matter of the invention. Therefore, a more extensive description is thought to be unnecessary.

What is claimed as new is as follows:

1. A fruit picker and gatherer which is manually handled by the user while standing on the ground in an advantageous picking position, said picker comprising an open top transparent sheet material receptacle which not only receives and collects the picked fruit but also picks the fruit, the same being imperforate and having flexibly resilient relatively short picking fingers at the top thereof, a drawstring encircling said fingers and slidably connected to the free end portions thereof, a handle, and a pull-cord on said handle connected to the drawstring for closing the fingers around the fruit.

2. A fruit picker and gatherer which is manually handled by the user while standing on the ground in an advantageous picking position, said picker comprising an open top transparent sheet material receptacle which not only receives and collects the picked fruit but also picks the fruit, the same being imperforate and having flexibly resilient relatively short coacting picking fingers at the top thereof for receiving the fruit therebetween, a drawstring encircling the fingers and slidably connected to the free end portions thereof, a handle, a pull-cord on said handle connected to the drawstring for closing the fingers around the fruit, said handle being tubular and the pull-cord operating through the bore thereof, and a sliding sleeve-like grip on the lower end of the handle to which the cooperating end of the pull-cord is connected.

3. A fruit picker and gatherer which is manually handled by the user while standing on the ground in an advantageous picking position, said picker comprising an open top transparent sheet material receptacle which not only receives and collects the picked fruit but also picks the fruit, the same being imperforate and having flexibly resilient relatively short coacting picking fingers at the top thereof, a drawstring encircling the fingers and slidably connected to the free end portions thereof, a handle, and a pull-cord on said handle and connected to the drawstring for closing the fingers around the fruit, said receiver being constructed of commercial plastics, the fingers defining V-shaped notches in the upper edge of the wall of the receptacle, said fingers including lugs and said lugs including apertures through which the drawstring slidably passes.

4. A fruit picker comprising an elongated tubular handle, a cylindrical receptacle of a transparent, plastic material on one end of said handle, said receptacle including an open top portion comprising a plurality of coacting resilient, tapered fingers integral with the receptacle and adapted to receive the fruit therebetween, transversely spaced grommets in the free end portion of one of the fingers adjacent to said one end of the handle, apertured lugs on the outer sides of the free end portions of the other fingers, a drawstring slidable through the lugs and the grommets, a pull-cord operable in the handle and connected at one end to the drawstring at a point between the grommets for closing the fingers around the fruit, and means for actuating the drawstring.

5. A fruit picker comprising an elongated tubular handle, a cylindrical receptacle of a transparent plastic material on one end of said handle, said receptacle including an open top portion comprising a plurality of coacting resilient, tapered fingers integral with the receptacle and adapted to receive the fruit therebetween, transversely spaced grommets in the free end portion of one of the fingers adjacent to said one end of the handle, apertured lugs on the outer sides of the free end portions of the other fingers, a drawstring slidable through the lugs and the grommets, a pull-cord operable in the handle and connected at one end to the drawstring at a point between the grommets for closing the fingers around the fruit, and means for actuating the drawstring, said means including an elongated socket slidably receiving the other end portion of the handle and providing a hand-grip therefor, said socket having an aperture in its bottom aligned with the handle and slidably receiving the pull-cord, said pull-cord having its other end anchored exteriorly to the socket adjacent the open end thereof.

6. A fruit picker comprising an elongated tubular handle, a receptacle on one end portion of said handle, said receptacle including an open top portion comprising a plurality of coacting, resilient fingers for receiving the fruit therebetween, a drawstring operatively connected to the fingers for closing same around the fruit, an elongated socket slidably mounted on the other end portion of the handle providing a hand-grip therefore, said socket having an aperture in its bottom aligned with the handle, and a pull-cord operable in the handle and having one end connected to the drawstring for actuating same, said drawstring having its other end portion passing slidably through the aperture and anchored exteriorly to the socket at a point remote from said bottom thereof.

References Cited in the file of this patent

UNITED STATES PATENTS

| | | |
|---|---|---|
| 621,509 | Truitt | Mar. 21, 1899 |
| 864,639 | Gier | Aug. 27, 1907 |

FOREIGN PATENTS

| | | |
|---|---|---|
| 209,281 | Switzerland | June 17, 1940 |